C. A. OLSON.
VENT VALVE.
APPLICATION FILED MAY 21, 1920.
1,365,720. Patented Jan. 18, 1921.
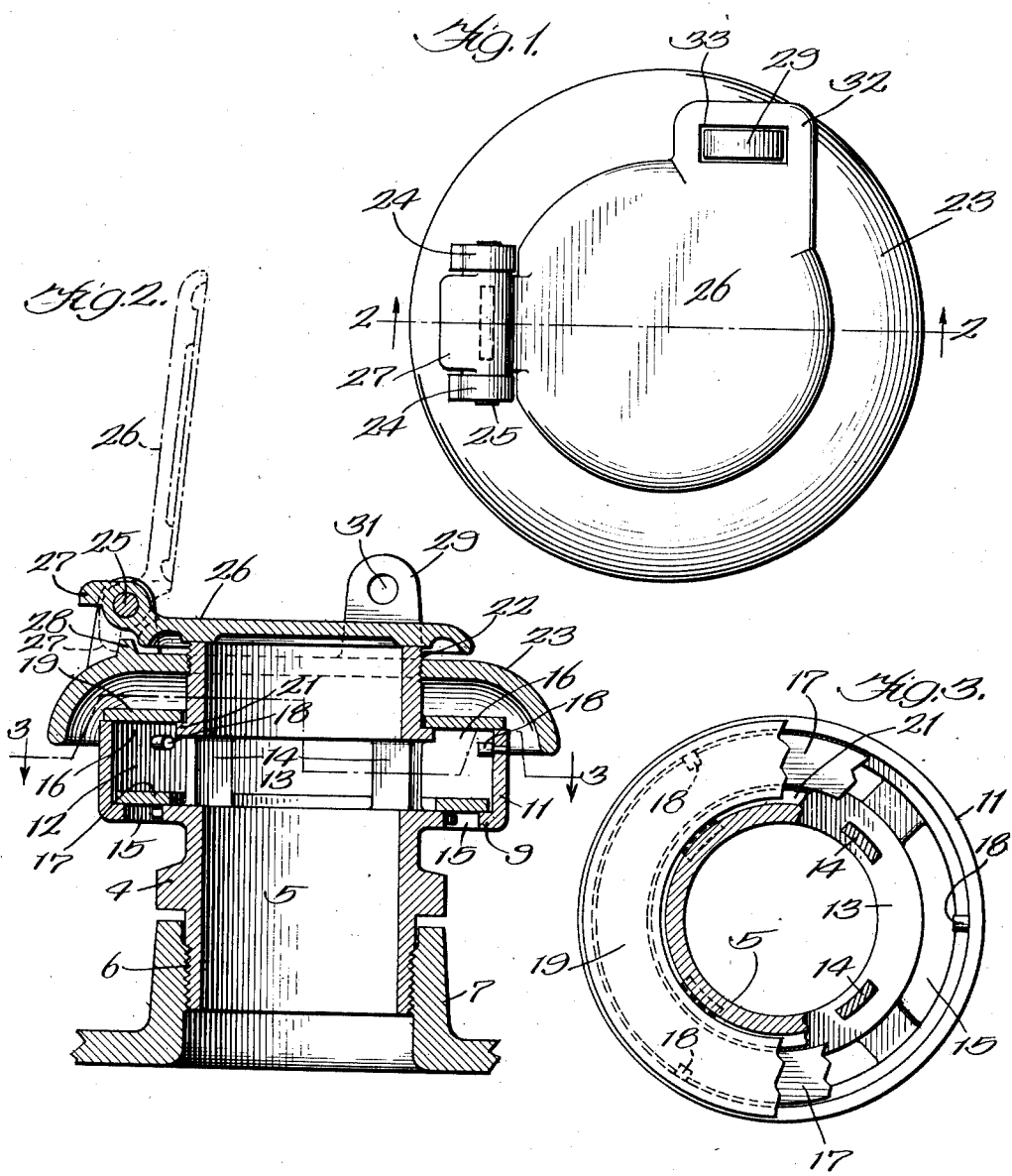

UNITED STATES PATENT OFFICE.

CHARLES A. OLSON, OF GENEVA, ILLINOIS, ASSIGNOR TO CRANE CO., OF CHICAGO, ILLINOIS, A CORPORATION OF ILLINOIS.

VENT-VALVE.

1,365,720.   Specification of Letters Patent.   Patented Jan. 18, 1921.

Application filed May 21, 1920. Serial No. 383,033.

*To all whom it may concern:*

Be it known that I, CHARLES A. OLSON, a citizen of the United States, residing at Geneva, in the county of Kane and State of Illinois, have invented certain new and useful Improvements in Vent-Valves, of which the following is a specification.

This invention relates in general to vent valves and has more particular reference to valves adapted for use on outside storage tanks in which gasolene, kerosene and the like are customarily stored.

One of the primary objects of the present invention is the provision of a valve for this purpose which will normally close and seal the tank or receptacle to which it is attached, so as to preclude the escape of volatile gases and prevent evaporation of the liquid in the tank, but which will permit the escape of the air displaced when the tank is being filled and will also permit inflow of air so as to prevent the formation of a vacuum and facilitate the discharge when a liquid is being withdrawn from the tank.

Another object of my invention is to provide a valve of this character which will afford an unobstructed passage or bore therethrough into the tank, through which a measuring stick or gage may be inserted without being obstructed or interfered with by projections or irregularities in the bore of the valve.

Still another object is to provide a valve which will afford protection to the outlet and inlet valves provided so that they will not become clogged or weighted with snow, sleet or the like and will operate whenever occasion requires, irrespective of weather conditions.

A further object of the invention is to provide a valve which will be simple in construction, cheap to manufacture, and easy to assemble, one which will not be liable to get out of order in use, and which will be reliable in operation, and one which, while normally sealing the tank, is readily accessible so that it can be quickly opened to permit unobstructed access to the interior of the tank when desirable.

Other objects and many of the inherent advantages of my invention will be appreciated by those skilled in the art as the same becomes better understood by reference to the following description when considered in connection with the accompanying drawings.

Referring to the drawings:

Figure 1 is a plan view of a vent valve embodying my invention;

Fig. 2 is a longitudinal sectional view on the line 2—2 of Fig. 1;

Fig. 3 is a transverse sectional view taken on the broken line 3—3 of Fig. 2.

By reference to the drawings it will be observed that my valves comprise essentially a body portion designated generally by reference character 4 of tubular form, providing a centrally unobstructed bore 5, the lower end of the body portion being exteriorly threaded at 6 for connection with the upstanding boss 7 of a tank or other receptacle to which the valve is to be attached.

Intermediate its ends the body portion of the valve is provided with a laterally extending circumferential flange 9 terminating at its perimeter in an upwardly extending flange 11 to thereby provide a chamber 12 surrounding the bore and communicating therewith through a series of openings 13 alternating with the connecting webs 14. This chamber is provided at its bottom with a series of inlet openings 15 and at the top with an outlet opening 16 extending entirely around the body portion between the body portion and the flange 11, so that through this chamber communication may be established between the bore of the valve and the surrounding atmosphere upon the establishment of a predetermined differential of pressure between the interior of the tank and the outside thereof.

The inlet openings 15 are normally closed by a flat ring valve 17 preferably formed of aluminum or other relatively light material and adapted to be disposed in chamber 12 so as to seat under gravity and close the openings 15. This valve is introduced into the chamber from the top thereof through this annular opening 16 which as will be observed is slightly wider than the valve 17 so that the valve may be dropped through this opening into the chamber. To prevent accidental escape of this valve through the openings after it has once been inserted the outer wall 11 is equipped with a plurality of inwardly projecting lugs or stops 18 which limit the upward movement of the valve 17 and also prevent its cramping or binding when in operation as it might do if elevated at one side too far from its seat.

The opening 16 which constitutes the outlet opening for the valve is likewise normally closed by a flat ring valve 19, similar in construction but somewhat wider than the valve 17, and for the purpose of affording a substantial seat for this valve the body portion is provided, in horizontal alinement with the top of the side wall 11 of the chamber, with a circumferential flange 21 forming a seat for the inner edge of the valve 19.

The upper end of the body portion is exteriorly threaded at 22, and a skirt 23 in the form of a disk having a down-turned periphery is threaded onto this upper end in position shown in Fig. 2 so that it covers and surrounds the valve 19 and the upper portion of the chamber 16, thus affording protection to this valve and also to the inlet valve 17 from snow, sleet, dirt and so forth, which might collect on the valve 19 and interfere with its operation or even drop into the chamber so as to interfere with the operation of the valve 17. This skirt therefore affords a permanent means of protection for the valves and insures their proper operation irrespective of weather conditions.

The upper face of the skirt 23 adjacent one side thereof is provided with a pair of upwardly extending ears 24, between which upon the pin 25, is pivoted the cap 26 normally forming a closure for the upper end of the valve bore, as shown in Fig. 2. This cap is adapted to be swung from the closed position shown in full lines to the dotted line position illustrated in Fig. 2, in which position it will be observed the cap lies entirely outside the circumferential plane of the bore 5 so as to permit the insertion of a gage or measuring stick practically the full size of the bore if so desired. At any rate a gage or stick may be inserted parallel with the axis of the bore without interference with the cap 26. In order to limit the opening movement of this cap it is preferably equipped outside the pivot with a tail lug 27 which is adapted to contact with an upwardly projecting abutment 28 formed on the skirt 23 to thereby sustain the cap in a self closing position.

For the purpose of locking the cap against unauthorized opening, the skirt is equipped with an upwardly extending lug 29 which is provided with an eye 31 adapted to accommodate the hasp of a padlock or other locking means. This lug, as will be apparent from Fig. 1 is disposed at one side of the bore 5 and the cap 26 is provided with a lateral extension 32 having an eye 33 adapted to receive the lug 29 when the cap is closed.

It will be manifest that by opening the cap 26 the tank may be filled through this valve if desired, but customarily the tank is filled through another opening and the cap 26 is opened only to permit the insertion of a gage for measuring purposes. The valve constructed as described serves to normally seal the tank and prevent the evaporation of the contained liquid or the escape of volatile gases, but when the tank is being filled the displaced air, when the pressure in the tank exceeds the weight of the valve 19, will elevate this valve, thus permitting the air to escape, and likewise, when liquid is being withdrawn from the tank, the valve 17 will be elevated to permit an inflow of air when the differential of pressures between the inside and outside of the tank exceeds the weight of this valve. It will be observed that this construction affords an unobstructed bore through the valve and into the tank, permits ingress or egress of air upon the establishment of a predetermined differential of pressures between the interior and exterior of the tank, affords protection to the valve against inclement weather and also provides a closure which can be locked against unauthorized opening.

It is believed that my invention and many of its attendant advantages will be understood from the foregoing without further description, and while I have shown and described a preferred embodiment thereof, it should be manifest that the invention is capable of considerable modification and variation without departing from the essence thereof as defined in the following claims.

I claim:

1. A vent valve comprising a body portion provided with circumferentially arranged inlet and outlet openings, closures for said openings disposed outside the bore of said valve, a protective flange for said outlet closure, and a cap adapted to cover the upper end of said bore.

2. A vent valve comprising a body portion provided with a longitudinal bore and circumferentially arranged inlet and outlet openings communicating with said bore, inlet and outlet valves to normally close said inlet and outlet openings respectively, a skirt fixed to said body portion and extending outwardly and downwardly over and around said outlet valve, and a cap carried by said skirt and adapted to close the upper end of said bore.

3. A vent valve comprising a body portion provided with a longitudinal bore, a chamber encircling said body portion and communicating with said bore, said chamber being provided with inlet and outlet openings, annular valves adapted to normally close said openings respectively, means for protecting said valves, and a cap pivoted to said means in position to close the upper end of said bore.

4. A vent valve comprising a body portion forming a longitudinal bore and a circumferentially disposed chamber communicating with said bore, said chamber being provided with inlet and outlet openings, a valve disposed within said chamber and adapted to normally close the inlet openings, a valve above said chamber adapted to normally close the outlet openings, a stationary protective skirt for said valve, and a closure for normally closing the upper end of said bore.

5. A vent valve comprising a body portion provided with an unobstructed longitudinal bore, a chamber surrounding said bore and provided with openings through which communication between said bore and the outside atmosphere is established, an inwardly opening valve disposed in said chamber and normally closing the inlet openings to said chamber, a valve disposed above said chamber and normally closing the outlet openings from said chamber, both of said valves being seated by gravity and adapted to open under differentials of pressure, a flanged skirt on said body portion extending over and downwardly and around said chamber, and a closure for the upper end of said bore mounted on said skirt.

6. A vent valve comprising a body portion provided with an unobstructed bore, a chamber surrounding said bore and communicating therewith, said chamber being provided with inlet and outlet openings, annular valves surrounding said bore and adapted to close said chamber openings, means for preventing displacement of said valves, and a pivotally mounted cap adapted when closed to cover the upper end of said bore and when open to be disposed outside the circumferential plane of said bore.

7. A vent valve comprising a body portion provided with a central bore, inlet and outlet openings communicating with said bore intermediate its ends, valves for closing said openings respectively, a protective skirt mounted on said body portion, and a closure cap for said bore pivotally mounted on said skirt.

CHARLES A. OLSON.